(12) United States Patent
Tominaga et al.

(10) Patent No.: US 6,226,258 B1
(45) Date of Patent: May 1, 2001

(54) OPTICAL RECORDING MEDIUM WITH TRANSMISSIVITY CONTROLLING LAYER

(75) Inventors: Junji Tominaga, 26-414-103, Matsushiro 4-chome; Takashi Nakano, 26-407-402, Matsushiro 4-chome; Nobufumi Atoda, 22-12, Sengen 1-chome, all of Tsukuba-shi, Ibaraki-ken (JP)

(73) Assignees: Japan as represented by Director General of Agency of Industrial Science and Technology, Tokyo-to; Junji Tominaga, Ibaraki-ken; Takashi Nakano, Ibaraki-ken; Nobufumi Atoda, Ibaraki-ken, all of (JP)

( * ) Notice: Subject to any disclaimer, the term of this patent is extended or adjusted under 35 U.S.C. 154(b) by 0 days.

(21) Appl. No.: 09/256,103

(22) Filed: Feb. 24, 1999

(30) Foreign Application Priority Data

Mar. 3, 1998 (JP) ................................... 10-067883

(51) Int. Cl.$^7$ ....................................................... G11B 3/70
(52) U.S. Cl. .................................................... 369/283
(58) Field of Search .................................. 369/283, 272, 369/288

(56) References Cited

U.S. PATENT DOCUMENTS

| | | | |
|---|---|---|---|
| 5,123,007 | * 6/1992 | Miyauchi et al. | 369/100 |
| 5,314,734 | * 5/1994 | Nishida et al. | 428/64.2 |
| 5,420,846 | * 5/1995 | Sugiyama et al. | 369/100 |
| 5,431,975 | * 7/1995 | Honguh et al. | 428/64.6 |
| 5,583,840 | * 12/1996 | Minemura et al. | 369/160 |
| 5,621,707 | * 4/1997 | Matsui | 369/14 |
| 5,646,924 | * 7/1997 | Nonoyama et al. | 369/58 |
| 5,736,657 | * 4/1998 | Ide et al. | 75/230 |
| 5,761,179 | * 6/1998 | Iwasaki et al. | 369/116 |
| 5,848,043 | * 12/1998 | Takada et al. | 369/116 |

OTHER PUBLICATIONS

Nishiuchi et al, "Feasibiltity Study of Ge–Sb Te Phase–change Optical Disk Medium for One–Pass Overwrite Digital Audio Recording" (Jpn. J. Appl. Phys. vol. 31 (1992) pp. 653–658).*

* cited by examiner

Primary Examiner—William R. Korzuch
Assistant Examiner—Julie Ann Watko
(74) Attorney, Agent, or Firm—Wenderoth, Lind & Ponack, LLP

(57) ABSTRACT

Disclosed is a novel optical recording medium which is a multi-layered body comprising: (a) a substrate disk of a transparent material; (b) a first protective layer formed on one surface of the substrate disk; (c) a recording layer formed on the first protective layer, which is made from a material capable of causing a change in the optical properties in response to light or heat; (d) a second protective layer formed on the recording layer; (e) a transmissivity-controlling layer formed on the second protective layer, which is made from a material capable of reversibly and continuously causing a change in the optical properties in response to light or heat at a speed higher than the speed of changes in the recording layer; and, optionally, (f) a third protective layer formed on the transmissivity-controlling layer. Method and apparatus for recording of signals and reproduction of recorded signals by using the above defined optical recording medium are also disclosed.

10 Claims, 3 Drawing Sheets

OPTICAL RECORDING MEDIUM WITH TRANSMISSIVITY CONTROLLING LAYER

BACKGROUND OF THE INVENTION

The present invention relates to an optical recording medium, method for optical recording by using the same, method for reproducing optical signals recorded thereon as well as an apparatus for optical recording by using the same and apparatus for reproducing optical signals recorded thereon.

In recent years, several types of optical recording media suitable for recording and reproduction of information signals in a high density at a high speed have been developed and are now widely employed in the information processing technology. The optical recording media now under practical applications as a rewritable optical recording medium include those of the magnetooptical (MO) recording type by utilizing the interaction of light with the magnetic behavior of the recording medium called the Kerr effect or Faraday effect, those of the phase-change (PC) type which utilizes the difference in a certain optical property such as transmissivity and reflectivity between an amorphous phase and a crystalline phase in an alloy composed of a chalcogen element. Besides, optical recording media of the writing-only type (WO) have already been commercialized. In this type of recording, the recording film contains an organic dye which is thermally decomposed by the heat of light to utilize the difference of the optical properties caused thereby for recording.

In these three types of optical recording media, the recording density is increasing year by year in recent years to comply with the requirements for accomplishing a more and more information-prevailing society. Very active investigations are now under way for the development of rewritable DVD-RAMs and non-rewritable DVD-Rs.

It is taken as prospective that the optical recording media of the phase-change type are the most suitable, among the three types of the recording media mentioned above, for high-density recording of information signals by virtue of the properties of the alloy used therein and various methods have been developed in this category. For example, a very high recording density of 15 gigabytes is already accomplished for a single side of a 12 cm-size disk of this type by combining a blue laser beam with a specific alloy as the recording medium as reported by Kitaoka, et al. in 1997 (Ninth Symposium on Phase-Change Recording, page 94). Further, a proposal is made by Hosaka, et al. in Japanese Journal of Applied Physics, volume 35 (1996), page 443 for a recording technology to accomplish a still higher recording density by utilizing the difference in the optical properties between two states of the recording layer induced by the phase change when conversion is effected from the as-deposited amorphous state into a crystalline state. By virtue of utilization of the near-field optical recording, a success has already been attained in this recording technology to accomplish a recording dot mark having a radius of as small as 60 nm to 200 nm. According to this report, however, a grain radius smaller than 60 nm could not be observed in the phase-change films. This is presumably because the activation energy accompanying the crystal growth was so large that the recording power was not large enough for the conversion in this method from the as-deposited state with randomness to a crystalline form of GeSbTe. Further, Sumi, et al. attempted recording on a phase-change recording film by utilizing an atomic force microscope (Japanese Journal of Applied Physics, volume 36, 1997, page 523). As a result, a charge distribution could be obtained by the Schottky contact between the recording film and the chromium-coated head of the atomic force microscope leading to the possibility of recording. Reportedly, a dot mark having a diameter of about 10 nm could be successfully recorded. Since the head of an atomic force microscope is used in the latter case, however, reproduction could not be performed for the recorded dot marks of 10 nm or smaller obtained in optical recording.

In connection with the high-density recording by the use of a near-field light or atomic force microscope, all of the reports available so far for reproduction of the recorded signals are directed to the experiments under a microscope and no reports are available for reproduction of recorded signals at a high transfer rate. This is presumably due to the distance between the head for recording or reproduction and the recording medium. In the case of the near-field recording, on the other hand, the propagating distance of the near-field light is so short as to be about 50 nm so that crashing may eventually take place between the recording medium and the head moving at a high speed over the recording medium when reading-out of the recorded data is performed at a high transfer rate to destroy the recorded data. This situation is the same also in the use of an atomic force microscope and it is impossible to control the distance between the head and the recording medium with an accuracy of a nanometer order. Due to these technological difficulties, high-speed recording and high-speed reading-out have not been accomplished heretofore in the high-density recording utilizing a near-field light.

SUMMARY OF THE INVENTION

In view of the above described problems and difficulties in the high-density recording by utilizing a near-field light, the present invention has an object to provide an optical recording medium suitable for recording of signals and reproduction of recorded signals at high speed, optical recording method and method for reproducing optical signals by using the same and apparatus for optical recording and apparatus for reproducing optical signals by using the same.

Thus, the present invention provides an optical recording medium which comprises, as a multi-layered body:
  (a) a substrate disk of a transparent material;
  (b) a first protective layer formed on one surface of the substrate disk;
  (c) a recording layer formed on the first protective layer, which is made from a material capable of causing a change in the optical properties in response to light or heat;
  (d) a second protective layer formed on the recording layer; and
  (e) a transmissivity-controlling layer formed on the second protective layer, which is made from a material capable of reversibly and continuously causing a change in the optical properties in response to light or heat at a speed higher than the speed of the change in the recording layer.

Though optional, (f) a third protective layer can be provided on the transmissivity-controlling layer (e) in the above defined inventive optical recording medium.

The present invention further provides a method and an apparatus for optical recording of signals and a method and an apparatus for reproducing recorded optical signals each by utilizing the above defined optical recording medium.

DETAILED DESCRIPTION OF THE PREFERRED EMBODIMENTS

In the following, the present invention is described in detail by making reference to the accompanying drawing.

Figure 1:
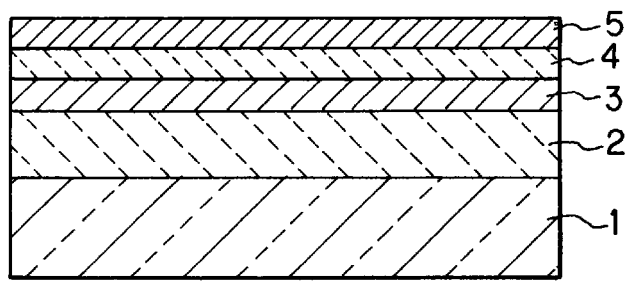
FIG. 1 is a vertical cross sectional view of an embodiment of the optical recording medium of the invention.
Figure 2:
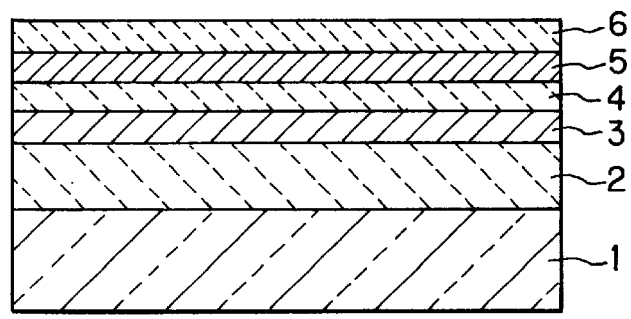
FIG. 2 is a vertical cross sectional view of another embodiment of the optical recording medium of the invention.

FIG. 1 shows an embodiment of the inventive optical recording medium by a vertical cross sectional view, which is a multi-layered body consisting of a transparent substrate disk 1, a first protective layer 2, a recording layer 3, a second protective layer 4 and a transmissivity-controlling layer 5. FIG. 2 shows another embodiment of the inventive optical recording medium by a vertical cross sectional view, which is a multi-layered body consisting of a transparent substrate disk 1, a first protective layer 2, a recording layer 3, a second protective layer 4, a transmissivity-controlling layer 5 and a third protective layer 6.

The requirements for the substrate disk 1 include high transparency, rigidity to ensure dimensional stability and excellent planarity of the surfaces only. The material thereof is not particularly limitative and can be selected, for example, from glass materials, polycarbonate resins and the like. Though optional, a guide groove or the like can be formed on the surface of the substrate disk 1 as a means for the control of the position of the laser head. The thickness of the substrate disk is in the range from 0.1 mm to 2 mm or, preferably, from 0.3 to 1 mm, though not particularly limitative thereto.

Directly on one surface of the transparent substrate disk 1, a first protective layer 2 is formed which serves to prevent deformation of the surface of the substrate disk 1. The material of the first protective layer is selected from transparent materials having a melting point of 1000° C. or higher. Particularly suitable materials of the first protective layer 2 are those having a high refractive index including silicon nitride SiN and a ZnS-SiO$_2$ composite dielectric which is widely used for the protective layer in phase-change optical recording media. Though not particularly limitative, the thickness of the first protective layer is in the range from 10 nm to 500 nm or, preferably, from 40 nm to 300 nm. No particular advantages can be obtained by excessively increasing the thickness of the first protective layer 2. When the substrate disk 1 is made from a plastic resin such as polycarbonate, it is sometimes advantageous to interpose a thin layer of a metal as a heat-dissipating layer between the substrate disk 1 and the first protective layer 2 with an object to protect the substrate disk 1 from the heat generated in the recording layer 3 on the first protective layer 2.

In the next place, a recording layer 3 for optical recording is formed on the first protective layer 2. The material to form the recording layer 3 is selected from those which cause a readable change in the optical properties as a result of a reversible phase change in response to light or heat. Various materials are known in the prior art to cause a phase change in response to light or heat applied thereto. Particular examples of such a material include, besides GeSbTe alloys, AgInSbTe alloys having a lower energy of crystallization and AgInSbTeV alloys susceptible to the control of the crystallization rate and inhibition of crystal growth.

The recording layer 3 in the form of a thin film can be formed by various known methods including the methods of physical vapor-phase deposition, chemical vapor-phase deposition, sputtering and the like used in the prior art for the formation of a thin film. For example, a thin film for the recording layer 3 consisting of an alloy of AgInSbTe or AgInSbTeV can be formed by the sputtering method using a target of the alloy prepared beforehand or by using two or more of the unit targets each containing one or more of the constituent elements of the alloy.

The thin film to work as the recording layer 3 can be in the so-called as-deposited state immediately after film formation but it is advantageous that the thin layer is used after phase stabilization by conversion from the as-deposited state of great randomness to a crystalline state with light or heat followed by further conversion into an amorphous state by increasing the temperature to the melting point or higher by laser beam irradiation or heating and then quenching at an extremely high cooling rate. The recording layer 3 of a GeSbTe alloy thus made amorphous has an activation energy of 1.4 to 1.7 eV and the crystalline transition temperature thereof corresponds assumably to about 150° C.

The recording layer 3 must have a thickness sufficient to cause a reversible phase change in response to light or heat. In this regard, the thickness of the recording layer 3 is preferably in the range from 5 nm to 30 nm.

The second protective layer 4 on the recording layer 3 is provided with an object to prevent mixing diffusion between the recording layer 3 and the transmissivity-controlling layer 5 formed thereon. The material of the second protective layer 4 is selected from those having the same properties as required for the material of the first protective layer 2. The second protective layer 4 should have a thickness in the range from 5 nm to 50 nm in view of the requirement that the second protective layer 4 must propagate the near-field light generated in the recording layer 3 to the transmissivity-controlling layer 5 thereon.

Finally, a transmissivity-controlling layer 5 is formed on the second protective layer 4. The transmissivity-controlling layer 5 serves to propagate the near-field light transmitted from the recording layer 3 through the aperture formed in the layer 5. The aperture in the transmissivity-controlling layer 5 serves as an aperture for the near-field micro-probe.

The material of the transmissivity-controlling layer 5 is selected from phase-change materials which cause a reversible phase change in response to light or heat and those materials exhibiting a large third-order non-linearity effect. As to the phase-change materials, it is essential to employ a material capable of exhibiting a rewriting speed higher than the rewriting speed of the material forming the recording layer 3 and capable of causing a change in the optical properties at a higher speed than the recording layer 3. Particular examples of the material suitable for the transmissivity-controlling layer 5 include antimony and alloys composed of antimony such as InSb, SbTe and AgSb, of which the content of antimony is at least 10% by moles, because good results can be obtained with an alloy based on antimony as compared with materials of other types.

The transmissivity-controlling layer 5 should have a thickness in the range from 2 nm to 100 nm or, preferably, from 5 nm to 50 nm.

It is optional to form a third protective layer 6 on the surface of the transmissivity-controlling layer 5 with an object to ensure stability of the transmissivity-controlling layer 5 for an optical change so that the number of reading-out repetition times can be increased.

The material of the third protective layer 6, if provided, can be selected from those materials having the same properties as required for the material of the first protective layer 2. The thickness of the third protective layer 6, when provided, is in the range from 5 nm to 200 nm or, preferably, from 5 nm to 100 nm.

In the following, description is given of the method and apparatus for information-recording by means of a near-field light employing the above described optical recording medium of the invention.

Figure 3:
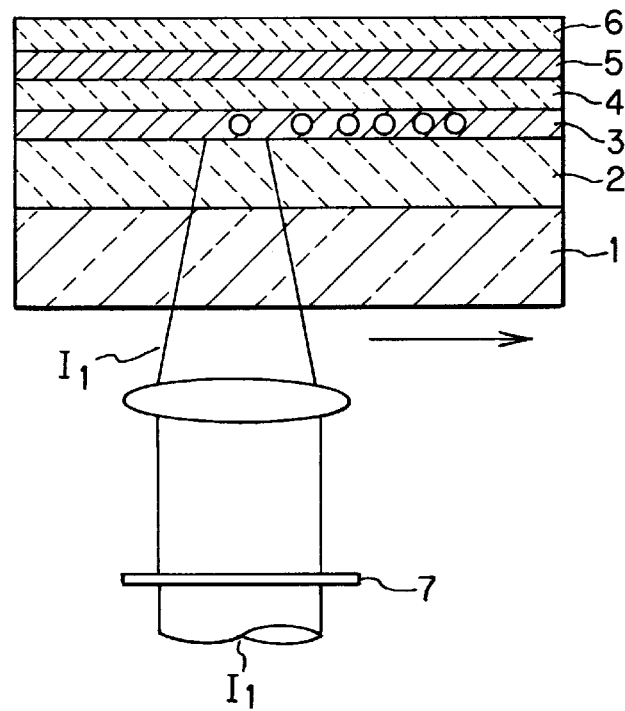
FIG. 3 is a schematic illustration of a system of the inventive apparatus for optical recording.

FIG. 3 is a schematic illustration of the method and apparatus system by employing the optical recording medium of the invention having the third protective layer 6. This figure is applicable in substantially the same way to the embodiment employing the optical recording medium without the third protective layer 6.

There can be two different ways in conducting information recording by using the recording apparatus system of the invention illustrated in FIG. 3.

In the first way of the method, the optical recording medium is irradiated, as is illustrated in FIG. 3, with a first incident light $I_1$ from the substrate side. The incident light $I_1$ here is preferably a laser beam of a short wavelength. The laser beam of short wavelength is, after modulation by passing a polarizing plate 7, condensed by means of an optical head onto the recording layer 3 thereby to form recording marks in the recording layer 3. The optical head can be the same one as those optical heads conventionally used in DVD-RAMs and the like.

The minimum mark size of the signals suitable for reproducing the signals is determined by the size of the laser spot as concentrated. For example, the spot diameter of a blue laser beam of 488 nm wavelength has a lower limit of about 0.6 $\mu$m. When a phase-change recording material is used for the recording layer 3, however, the mark size is limited by the melting point of the recording layer 3 by itself and a smaller spot diameter can be obtained by appropriately selecting the material of the recording layer 3. When the irradiation intensity of the laser beam is controlled at a low level, a still smaller mark size can be accomplished irrespective of the diffraction limit due to the intensity and form of the laser beam.

The apparatus for practicing the above described information recording method comprises the above described optical recording medium, a means for supporting and driving the same at a high velocity, a light-generating means to generate a laser beam for the above mentioned first incident light $I_1$ and a means for modulating and condensing of the light to irradiate the recording layer 3 of the optical recording medium.

Figure 4:
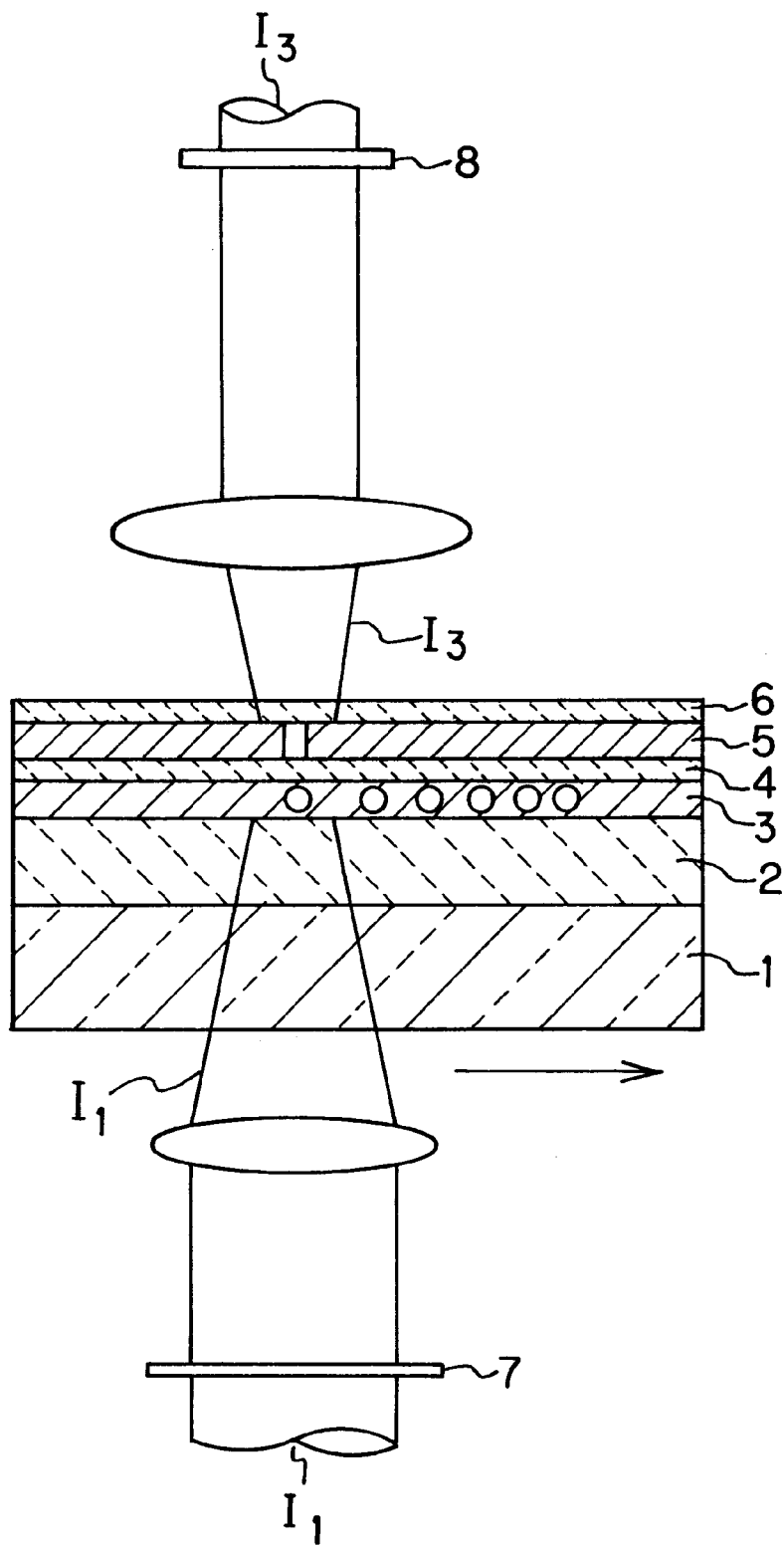
FIG. 4 is a schematic illustration of a system of the inventive apparatus for optical recording as a further embodiment.

Besides the above described method for information recording, an alternative method is illustrated by FIG. 4, according to which the recording layer 3 is, similarly to the above described first method, irradiated from the substrate disk side with a first incident light $I_1$ to record the signals in the recording layer 3 and, simultaneously, the recording medium is irradiated from the side of the transmissivity-controlling layer 5 with a third incident light $I_3$ after passing a second polarizing plate 8 so as to form a micro-aperture in the transmissivity-controlling layer 5 by means of light or heat thereby to record the signals.

The interaction of the first incident light $I_1$ and the third incident light $I_3$ transmitting the micro-aperture provides a possibility of reducing the size of the recording marks to be equivalent to the size of the micro-aperture or even smaller. The thus recorded microscopically fine signal marks have a size smaller than the diffraction limit of the above mentioned optical head used for recording as a matter of course so that the signals cannot be read out by using the same.

The apparatus for practicing the second method for information recording according to the present invention is illustrated in FIG. 4. The recording apparatus comprises the above mentioned optical recording medium, a means for supporting and driving the same at a high velocity, a first light-generating means to generate a laser beam which serves as the above mentioned first incident light $I_1$, a means for irradiating the recording layer 3 of the above mentioned optical recording medium with the light $I_1$ after polarization and condensing, a second light-generating means to generate a laser beam which serves as the third incident light $I_3$ and a means for irradiating the transmissivity-controlling layer 5 with the light $I_3$ after polarization and condensing.

Figure 5:
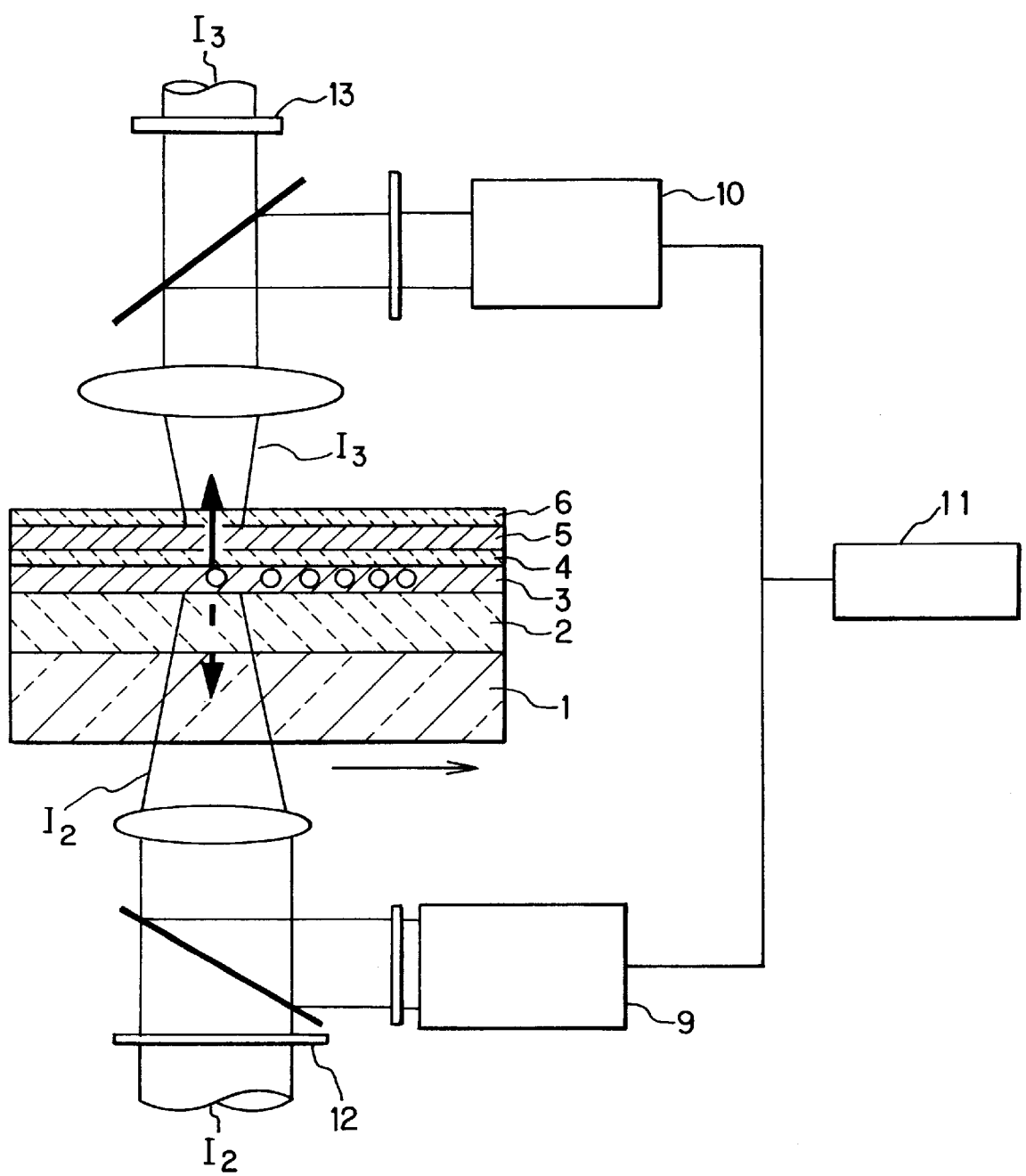
FIG. 5 is a schematic illustration of a system of the inventive apparatus for reproducing optical records.

FIG. 5 schematically illustrates the method and an apparatus system of the present invention for reproducing the signals recorded in the optical recording medium as described above. Reproduction of recorded fine signals can be performed by irradiating the fine signals recorded within the recording film constituting the recording layer 3 of the optical recording medium with a second light $I_2$ attenuated to such an extent as not to destroy the recorded signals from the side of the transparent substrate disk 1. Simultaneously under irradiation of the recording layer 3 with the second incident light $I_2$, the transmissivity-controlling layer 5 is irradiated with a third incident light $I_3$ from the side of the third protective layer 6. This third incident light $I_3$ is a laser beam condensed in the same manner as in the first and second incident lights. The wavelength of the third incident light $I_3$ can be the same as those of the first and second incident lights but it is advantageous to use a third incident light $I_3$ having a wavelength different from those of the first and second incident lights in order to detect the near-field light with higher accuracy because the constitution of the apparatus system and handling of the apparatus can be simplified thereby.

The distance between the optical recording medium and the light-condensing head is not particularly limitative and can be selected for the particular apparatus system within the controllable range of, for example, about 0.5 mm or smaller employed for the voice-coil type focus control in DVD-RAMs and the like.

As the intensity of the third incident light $I_3$ is increased, a domain with alteration in the light transmissivity or a micro-aperture can be generated within the irradiated spot of the transmissivity-controlling layer 5 by the light itself or by the heat generated by absorption of the light. Thus, reproduction of the signals is accomplished by propagating the near-field light generated inside of the recording layer 3 by the second incident light $I_2$ after passing the second protective layer 4 through this micro-aperture.

Alternatively, the near-field light generated from the third incident light $I_3$ by this micro-aperture is propagated toward the substrate disk 1 through the marks recorded in the recording layer 3.

The recorded signals can be detected with a sufficient signal intensity for reproduction of the signals by measuring the lights in a light detectors 9,10 connected to the rear of the head for the irradiation of the third incident light $I_3$ or to the rear of the head for the irradiation of the second incident light $I_2$, respectively, through the polarizing plates 12,13.

Namely, high-speed reproduction of signals can be performed by maintaining a sufficient distance between the signal-reproducing head and the optical recording medium without the risk of direct crashing when the near-field light is detected by making a micro-aperture for the detection of the near-field light, which has been located at the detector side, in the transmissivity-controlling layer 5 by maintaining a constant thickness of the second protective layer 4 at the recording medium side.

The apparatus system for reproducing recorded signals according to the present invention is schematically illustrated in FIG. 5. The signal reproducing apparatus comprises a first irradiating means for irradiation of the recording layer 3 with the second incident light $I_2$ from the side of the transparent substrate disk 1, a second irradiating means for the irradiation of the transmissivity-controlling layer 5 with the third incident light $I_3$ from the side of the third protective layer 6, light detectors 9,10 each connected to these irradiating means through polarizing plates 12,13 and a measuring instrument 11 connected to these light detectors 9,10. In sum, the signal reproducing apparatus of the invention is constituted from the optical recording medium, a means for supporting and driving the recording medium and means for detecting and measuring the lights after passing the recording layer 3 and transmissivity-controlling layer 5.

In this signal reproducing apparatus, the signals recorded in the recording layer 3 are irradiated with the second incident light $I_2$ by the irradiating means therefor from the side of the transparent substrate disk 1. On the other hand, the transmissivity-controlling layer 5 is irradiated with the third incident light $I_3$ generated by the irradiating means therefor to cause a change in the light transmissivity of the layer 5. The signals recorded in the recording layer 3 are irradiated from the side of the transparent substrate disk 1 with the second incident light $I_2$ which is attenuated to such an intensity as not to destroy the recorded signals.

As the intensity of the third incident light $I_3$, with which the transmissivity-controlling layer 5 is irradiated simultaneously under irradiation with the second incident light $I_2$, is increased, a domain having an altered light transmissivity or micro-aperture is formed within the irradiated spot of the transmissivity-controlling layer 5 by means of the light by itself or by means of the heat generated by absorption of the light.

The near-field light generated in the recording layer 3 by the second incident light $I2$ passes the micro-aperture through the second protective layer 4. Alternatively, the near-field light consisting of the third incident light $I_3$ generated by passing the micro-aperture is propagated toward the side of the substrate disk 1 through the marks recorded in the recording layer 3.

These lights are measured by the light detectors 9, 10 each connected to the rear of the head for the irradiation of the second incident light $I_2$ or to the rear of the head for the irradiation of the third incident light $I_3$. The recorded signals can be detected in this way with a sufficiently high signal intensity. Namely, high-speed reproduction of recorded signals can be performed by maintaining a sufficiently large distance between the signal reproducing head and the optical recording medium without a risk of direct crashing thereof by detecting the near-field light maintaining a constant thickness of the second protective layer 4 by means of the micro-aperture, which has been heretofore at the detector side, at the side of the optical recording medium.

In the following, the present invention involving various aspects is described in more detail by way of Examples, which, however, never limit the scope of the invention in any way.

EXAMPLE 1

A 0.6 mm thick glass substrate disk of good surface planarity was successively provided on one surface with coating layers including, firstly, a 50 nm thick layer of silicon nitride as a first protective layer, secondly, a 15 nm thick layer of an alloy of GeSbTe in a molar ratio of 2:2:5 as a phase-change recording layer, thirdly, a 10 nm thick layer of silicon nitride as a second protective layer and, fourthly, a 15 nm thick layer of antimony as a transmissivity-controlling layer to give an optical recording medium, which is referred to as the medium-1 hereinafter. These coating layers were successively formed in a vacuum film-forming chamber under the conditions given below.

The silicon nitride layers were formed each by the sputtering method in an atmosphere of a mixture of argon and nitrogen gas under a pressure of 0.5 Pa by using a target of silicon. The thus formed silicon nitride layer had a refractive index of 1.9.

The medium-1 was first heated at 200° C. to effect complete crystallization of the recording layer. The medium-1 was, while being rotated at a linear velocity of 6 m/s, irradiated with an argon ion laser beam of 488 nm wavelength as a first incident light from the substrate disk side. A single signal of 30 MHz corresponding to a mark length of 100 nm was recorded at a 6.0 mW power with a numerical aperture of the lens of 0.6.

Along with a decrease of the laser intensity to 1.2 mW for the second incident light, in the next place, a laser beam of 630 nm wavelength was inputted as a third incident light from the side of the transmissivity-controlling layer through a lens of a numerical aperture of 0.8. As the intensity of the third incident light was gradually increased from 0.7 mW up to 5.0 mW, a signal of 30 MHz was observed with a C/N larger than 30 dB when the intensity was 3.0 mW.

EXAMPLE 2

A 0.6 mm thick glass substrate disk of good surface planarity was successively provided on one surface with coating layers including, firstly, a 50 nm thick layer of silicon nitride as a first protective layer, secondly, a 15 nm thick layer of an alloy of GeSbTe in a molar ratio of 2:2:5 as a phase-change recording layer, thirdly, a 10 nm thick layer of silicon nitride as a second protective layer, fourthly, a 15 nm thick layer of antimony as a transmissivity-controlling layer and, fifthly, a 10 nm thick layer of silicon nitride as a third protective layer to give an optical recording medium, which is referred to as the medium-2 hereinafter. These coating layers were successively formed in a vacuum film-forming chamber under the conditions given below.

The silicon nitride layers were formed each by the sputtering method in an atmosphere of a mixture of argon and nitrogen gas under a pressure of 0.5 Pa by using a target of silicon. The thus formed silicon nitride layer had a refractive index of 1.9.

The medium-2 was first heated at 200° C. to effect complete crystallization of the recording layer. The medium-2 was, while being rotated at a linear velocity of 6 m/s, irradiated with an argon ion laser beam of 488 nm wavelength as a first incident light from the substrate disk side. A single signal of 30 MHz corresponding to a mark length of 100 nm was recorded at a 6.0 mW power with a numerical aperture of the lens of 0.6.

Along with a decrease of the laser intensity to 1.2 mW for the second incident light, in the next place, a laser beam of 630 nm wavelength was inputted as a third incident light from the side of the third protective layer through a lens of a numerical aperture of 0.8. As the intensity of the third incident light was gradually increased from 0.7 mW up to 5.0 mW, a signal of 30 MHz was observed with a C/N larger than 40 dB when the intensity was 4.5 mW.

EXAMPLE 3

An optical recording medium, which is referred to as the medium-3 hereinafter, was prepared in just the same manner as for the medium-2 in Example 2.

The medium-3 was first heated at 200° C. to effect complete crystallization of the recording layer. The medium-3 was, while being rotated at a linear velocity of 6 m/s, irradiated with an argon ion laser beam of 488 nm wavelength as a first incident light from the substrate disk side. A single signal of 30 MHz corresponding to a mark length of 100 nm was recorded at a 5.0 mW power with a numerical aperture of the lens of 0.6. Simultaneously, a laser beam of 488 nm wavelength was inputted as a third incident light at a power of 3.8 mW from the side of the third protective layer through a lens of a numerical aperture of 0.8.

Along with a decrease of the laser intensity to 1.2 mW for the second incident light, in the next place, a laser beam of 488 nm wavelength was inputted as the third incident light from the side of the third protective layer through a lens of a numerical aperture of 0.8. The second and the third incident lights were polarized in such polarizing directions that the second incident light and the third incident light cancelled each the other. As the intensity of the third incident light was gradually increased from 0.7 mW up to 5.0 mW, a signal of 30 MHz was observed with a C/N larger than 35 dB when the intensity was 3.8 mW.

EXAMPLE 4

An optical recording medium, which is referred to as the medium-4 hereinafter, was prepared in just the same manner as for the medium-2 in Example 2.

The medium-4 was first heated at 200° C. to effect complete crystallization of the recording layer. The medium-4 was, while being rotated at a linear velocity of 6 m/s, irradiated with an argon ion laser beam of 488 nm wavelength as a first incident light from the substrate disk side. A single signal of 30 MHz corresponding to a mark length of 100 nm was recorded at a 5.0 mW power with a numerical aperture of the lens of 0.6. Simultaneously, a laser beam of 488 nm wavelength was inputted as a third incident light at a power of 3.8 mW from the side of the third protective layer through a lens of a numerical aperture of 0.8.

Along with a decrease of the laser intensity to 1.2 mW for the second incident light, in the next place, a laser beam of 488 nm wavelength was inputted as the third incident light from the side of the third protective layer through a lens of a numerical aperture of 0.8. The second and the third incident lights were polarized in such polarizing directions that the second incident light and the third incident light cancelled each the other. As the intensity of the third incident light was gradually increased from 0.7 mW up to 5.0 mW, a signal of 30 MHz was observed with a C/N larger than 40 dB when the intensity was 3.8 mW.

EXAMPLE 5

An optical recording medium, which is referred to as the medium-5 hereinafter, was prepared in the same manner as for the medium-2 in Example 2 excepting for an increase of the thickness of the second protective layer from 10 nm to 100 nm.

The medium-5 was first heated at 200° C. to effect complete crystallization of the recording layer. The medium-5 was, while being rotated at a linear velocity of 6 m/s, irradiated with an argon ion laser beam of 488 nm wavelength as a first incident light from the substrate disk side. A single signal of 30 MHz corresponding to a mark length of 100 nm was recorded at a 6 mW power with a numerical aperture of the lens of 0.6.

Along with a decrease of the laser intensity to 1.2 mW for the second incident light, in the next place, a laser beam of 488 nm wavelength was inputted as the third incident light from the side of the third protective layer through a lens of a numerical aperture of 0.8. The second and the third incident lights were polarized in such polarizing directions that the second incident light and the third incident light cancelled each the other. As the intensity of the third incident light was gradually increased from 0.7 mW up to 5.0 mW, a signal of 30 MHz was observed with a C/N of 10 dB or lower when the intensity was 3.8 mW.

What is claimed is:

1. An optical recording medium which comprises, as a multi-layered body:

(a) a substrate disk of a transparent material;

(b) a first protective layer formed on one surface of the substrate disk;

(c) a recording layer formed on the first protective layer, which is made from a material capable of causing a change in the optical properties in response to light or heat at a given speed;

(d) a second protective layer formed on the recording layer; and (e) a transmissivity-controlling layer formed from antimony or an antimony-containing alloy in a thickness of 2 to 100 nm on the second protective layer, and which reversibly and continuously causes a change in the optical properties in response to light or heat at a speed higher than the speed of change in the recording layer.

2. The optical recording medium as claimed in claim 1 which further comprises:

(f) a third protective layer formed on the transmissivity-controlling layer.

3. The optical recording medium as claimed in claim 2 in which the material forming each of the first to third protective layers is silicon nitride or a composite dielectric of $ZnS-SiO_2$.

4. The optical recording medium as claimed in claim 2 in which the third protective layer has a thickness in the range from 5 nm to 200 nm.

5. The optical recording medium as claimed in claim 1 in which the material forming the recording layer is selected from the group consisting of GeSbTe alloys, AgInSbTe alloys and AgInSbTeV alloys.

6. The optical recording medium as claimed in claim 1 in which the material forming the substrate disk is glass or a polycarbonate resin.

7. The optical recording medium as claimed in claim 1 in which the first protective layer has a thickness in the range from 10 nm to 500 nm.

8. The optical recording medium as claimed in claim 1 in which the recording layer has a thickness in the range from 5 nm to 30 nm.

9. The optical recording medium as claimed in claim 1 in which the second protective layer has a thickness in the range from 5 nm to 50 nm.

10. The optical recording medium as claimed in claim 1 wherein the thickness of the transmissivity-controlling layer is in the range of from 5 nm to 50 nm.

* * * * *